2,985,510
PROCESS FOR PREPARING DIBORANE

George H. Kalb, Landenberg, Pa., assignor to E. I. du Pont de Nemours and Company, Wilmington, Del., a corporation of Delaware No Drawing. Filed Apr. 1, 1957, Ser. No. 649,643

6 Claims. (Cl. 23—204)

This invention relates to boron hydrides and more particularly to a new method for making diborane and higher boron hydrides.

Diborane, a basic chemical in boron chemistry, is useful in a wide variety of applications. Almost every boron compound of importance can be directly obtained from it. Diborane can be pyrolyzed under controlled conditions to form boron or boride coatings on metals or ceramics. Diborane and higher boron hydrides are useful as high energy fuels.

Several methods for preparing diborane and other boron hydrides have been disclosed heretofore. However, these older methods possess certain deficiencies. Some, for example, give poor yields of diborane, and others require the use of expensive or relatively unavailable starting materials. In others the diborane formed is contaminated with appreciable amounts of hydrocarbons, hydrogen chloride, etc. and these impurities are difficult to remove.

In view of the potential importance of diborane, this invention has as an object a preparation of diborane and higher boron hydrides from readily available starting materials. A further object is provision of a novel method for preparing diborane that allows improved equipment design for manufacturing it on a large scale. Other objects will appear hereafter.

These objects are accomplished in accordance with the present invention by a process which comprises contacting a boron ester (a borate or a boroxole) with hydrogen at a temperature between 100 and 800° C. in the presence of a metal of the group consisting of aluminum and iron, and in the presence of a flux comprising a metal halide or a mixture of metal halides, that is molten at the operating temperature and is inert to diborane.

This process for preparing diborane can be carried out under a wide range of operating pressures. Pressures ranging from about 0.5 atmosphere up to 1000 atmospheres or more are operable. The only upper limit of pressure is the strength of the equipment available for carrying out the reaction. The higher pressures in the range mentioned above, e.g., pressures exceeding about 400 atmospheres, are generally used with the lower operating temperatures, e.g., at temperatures below about 300° C. in order to obtain good conversions.

Reaction temperatures of 100° to 800° C. are operable in the process of this invention. It will be understood that the particular temperature employed in any individual case is dependent on the particular flux being employed. The combination of temperature and metal halide flux selected should be such as to provide a molten reaction mixture. Temperatures above 150° C. are generally preferred. Temperatures above 300° C. are particularly well suited for carrying out the reaction by a continuous process since this type of process is capable of providing short contact times of the reactants and the reaction products at the operating temperature. When operating temperatures of 300° C. and higher are being used, it is important that the reaction product be removed from the reaction zone and cooled rapidly in order to minimize degradation of the diborane. For this reason, it is preferred to cool the reaction gases to a temperature below 300° C. in less than one minute, and preferably in less than 30 seconds. When the process is carried out at a temperature of 100° to 250° C. reaction times of ½ hour to 5 hours are generally useful.

The proportions of reactants used in the process of this invention are not critical. An excess of hydrogen and the electropositive metal, i.e., aluminum or iron, based on the amount of boron ester is satisfactory. The excess of hydrogen and electropositive metal can range up to 100% or more, based on the weight of the boron ester.

As indicated above, any metal halide or mixture of metal halides that is molten at the reaction temperature can be used as the flux in the process of this invention. Preferred fluxes are mixtures of alkali metal halides or alkaline earth metal halides in which the halogen has an atomic number of at least 17, i.e., is chlorine, bromine, or iodine. Specific examples of suitable fluxes include mixtures of aluminum trichloride with lithium, sodium, potassium, rubidium or cesium halide. Mixtures of these halides containing at least 50 mole percent of aluminum trihalide are particularly preferred as they are lower melting than mixtures containing lower portions of aluminum chloride. In addition to the specific mixtures mentioned above, the following halides are also useful as fluxes in the process of this invention: mixtures of sodium chloride and magnesium chloride, zinc chloride with alkali metal halides, and zinc chloride alone.

In some cases it is desirable to include in the reaction system a catalyst, although this is not essential for the operability of the process. Iodine, methyl iodide, or mixtures of these in any proportions can be used as catalysts. The amount of such catalysts can range up to 2% of the total weight of the reactants.

The reactants used in this process can be of the ordinary grades of materials available commercially. The hydrogen should be oxygen-free. Particle size of solid reactants is not critical since reaction takes place in the molten flux. However, granular or powdered solid reactants are preferred since more rapid and intimate mixing of the reactants can be obtained with finely divided materials.

The process of this invention is conveniently carried out in a corrosion-resistant reaction vessel capable of withstanding superatmospheric pressure. Preferably the reaction vessel is capable of being agitated, or means are provided for stirring the reaction mixture, although this is not essential. The reactor is charged with the boron ester, the electropositive metal, the flux, and the catalyst, if one is used, and is then closed and evacuated. If the reactor is to be agitated, it is often convenient to include in the reaction vessel a mixing aid, e.g., stainless steel balls.

Hydrogen is then introduced into the reaction vessel to provide the desired pressure at the selected reaction temperature, and the vessel is heated to this temperature. Additional hydrogen can be introduced periodically to maintain the pressure at the selected value. However, this is not essential if sufficient hydrogen was added initially to provide an excess for the reaction.

After the reaction is completed, which is indicated by a cessation in the absorption of hydrogen, the reaction vessel is cooled. If the reactor has been agitated it is desirable to inject hydrogen during the cooling step to remove any solid materials that might be plugging the outlet. After the reaction gases are cooled, they are carefully bled through traps cooled to a low temperature, e.g., by means of liquid nitrogen, to isolate condensable gaseous reaction products. The composition of the condensed gases in the cold trap can readily be determined by means of the mass spectrometer. If desired, the diborane and higher boron hydrides condensed in the trap can be isolated by fractional distillation.

The process of this invention is illustrated in further detail by the following examples.

*Example I*

A corrosion-resistant reaction vessel made of stainless steel, having an internal volume of 400 ml., and capable of withstanding high pressures is charged with 113 g. of anhydrous aluminum trichloride, 30 g. of sodium chloride, 20 g. of aluminum powder, and 20 g. of methyl borate, $B(OCH_3)_3$. The vessel is closed and evacuated; then sufficient hydrogen is introduced to provide a pressure of 800 atmospheres at the operating temperature of 170° C. The reaction vessel is then heated to 170° C. and agitated vigorously for five hours at the operating temperature to insure good contact between the gaseous and the liquid reactants. The reaction vessel is cooled and then carefully opened. The gaseous products are bled into a trap cooled by liquid nitrogen. There is obtained 0.72 g. of condensed product which has a molecular weight of 28.3. The theoretical molecular weight of diborane is 27.7. When this product is ignited it burns in air with a green flame. This is essentially pure diborane. This yield of diborane represents a 20% conversion of methyl borate.

*Example II*

A vessel similar to that described in Example I is charged with 20 g. of aluminum powder, 14 g. of B,B,B,-trimethoxyboroxole, 226 g. of aluminum trichloride, and 34 g. of potassium chloride and hydrogen pressure sufficient to give 800 atmospheres at 180° C. is applied. The reaction mixture is maintained under these conditions for five hours and then is cooled to ordinary temperatures. The gaseous products are bled through a liquid nitrogen trap. Mass spectrographic analysis of the condensed product indicates that it contains 35–40% of diborane.

While the examples have illustrated the process of this invention by reference to the use of specific boron esters, it will be understood that the reaction can be carried out with any boron ester, $B(OR)_3$, including the boroxoles, $(OBOR)_3$, where R is a monovalent hydrocarbon radical. Other specific boron esters that can be substituted for the methyl borate and trimethoxyboroxole of the examples include ethyl borate, isopropyl borate, n-butyl borate, phenyl borate, p-tolyl borate, B,B,B-triethoxyboroxole and B,B,B-tricyclohexoxyboroxole. Since the alcohol radical of these boron esters is split out as a by-product in the process of this invention, it is preferred for economic reasons to use the boron esters of lower alcohols in this process, e.g., methyl or propyl borate and trimethoxyboroxole.

The process of this invention possesses the advantages of employing readily available boron compounds and readily available electropositive metals as the starting materials. Since the boron esters are liquids, they are especially well suited for use in large scale manufacturing processes. The process of this invention also possesses the advantage of producing diborane of high degree of purity.

The embodiments of the invention in which an exclusive property or privilege is claimed are defined as follows.

I claim:

1. A method for preparing diborane which comprises reacting a boron ester with hydrogen in a molten metal halide flux inert to diborane at a temperature of from 100 to 800° C. in the presence of a metal of the group consisting of aluminum and iron, said flux comprising an aluminum halide.

2. Process of claim 1 wherein the boron ester is a borate of the formula $$B(OR)_3$$

in which R is a monovalent hydrocarbon radical.

3. Process of claim 1 wherein the boron ester is a boroxole of the formula $$(OBOR)_3$$

in which R is a monovalent hydrocarbon radical.

4. Process of claim 1 wherein said flux is a mixture of aluminum and alkaline earth metal halides containing at least 50 mole percent of aluminum trihalide.

5. Process of claim 1 wherein said flux is a mixture of an aluminum halide and at least one other metal halide.

6. Process of claim 1 wherein said flux is a mixture of aluminum and alkali metal halides containing at least 50 mole percent of aluminum trihalide.

References Cited in the file of this patent

UNITED STATES PATENTS

| | | |
|---|---|---|
| 2,469,879 | Hurd | May 10, 1949 |
| 2,744,810 | Jackson | May 8, 1956 |
| 2,864,671 | Mohlman | Dec. 16, 1958 |

OTHER REFERENCES

Uhlich et al.: "Zeitschrift für Physikalische Chemie," Sec. A, vol. 165, pages 294–310 (1933).

Final Report, Navy Contract NOa(s) 9973, Bureau of Aeronautics, "The Preparation of Pentaborane and the Evaluation of the Hazards of Handling Diborane and Pentaborane," prepared by Mine Safety Appliance Co., printed December 1, 1950, declassified May 11, 1954, pp. 11–13.